July 2, 1935. C. F. STRONG 2,006,524
ALTERNATING CURRENT GENERATING SYSTEM
Filed March 23, 1934 2 Sheets-Sheet 1

INVENTOR
C. F. Strong
By Edward L. Hathaway
ATTY.

July 2, 1935.                C. F. STRONG                2,006,524
           ALTERNATING CURRENT GENERATING SYSTEM
                Filed March 23, 1934        2 Sheets-Sheet 2
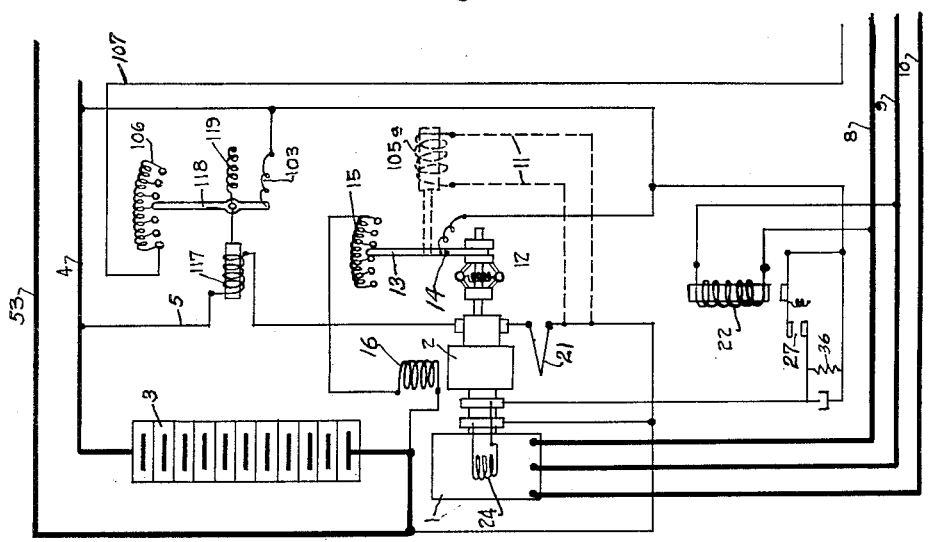
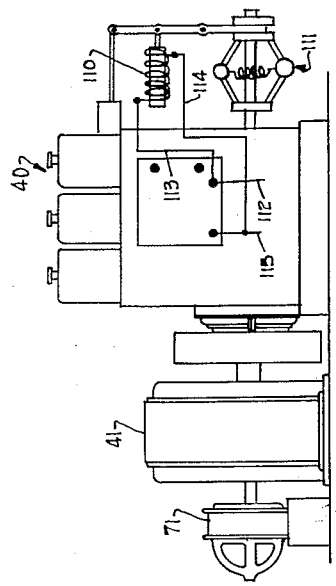
INVENTOR
C. F. STRONG
BY
ATTORNEY Patented July 2, 1935

2,006,524

UNITED STATES PATENT OFFICE 2,006,524

ALTERNATING CURRENT GENERATING SYSTEM

Chester F. Strong, New York, N. Y.

Application March 23, 1934, Serial No. 716,977

20 Claims. (Cl. 290—30)

This invention relates to an improved alternating current power generating system and apparatus and more particularly to an improved system employing a synchronous generating unit and an asynchronous generating unit or units.

A great many attempts have heretofore been made to provide relatively inexpensive alternating current generating plants employing prime mover driven generators, but such systems have been relatively complicated in view of the necessity of not only maintaining substantially constant frequency and voltage but also because of the difficulties attendant upon connecting the alternating current generators to the line upon increases of line load. Such prior systems have been particularly complicated when it has been attempted to provide a plurality of prime mover operated alternating current generators to be automatically started and connected to the line in accordance with predetermined increases of line load, such a wholly automatic system being particularly desirable where it is necessary to keep operating and maintenance expenses to a minimum.

It is one object of my invention to provide an alternating current generating system having an improved combination of a synchronous generator and one or more asynchronous generators adapted to be automatically started and/or stopped in accordance with line load. Another object in this respect is to provide improved means whereby the synchronous generator carries a relatively small proportion of the total line load and yet the asynchronous generators are so controlled as to be compelled to carry a larger proportion of the line load when these generators are brought on to the line.

A further and more specific object of the invention is to provide a synchronous generator driven by a direct current motor in combination with one or more asynchronous generators and means whereby upon an increase of line load the synchronous speed is automatically slightly decreased below that of the asynchronous generator thereby to cause the latter to carry its proportion of the load. A still further and more specific object in this respect of the invention is not only to automatically slightly decrease the speed of the synchronous unit but also to substantially simultaneously automatically increase the asynchronous speed above synchronism, to cause the asynchronous generator to carry more of the line load.

Other objects and advantages have to do with controlling the prime mover driven asynchronous generator by the combined actions of a synchronous speed governor and a current responsive means associated with the synchronous generating machines, of utilizing a source of direct current preferably in the nature of a storage battery arranged to supply the direct current motor of the synchronuos generator when this unit operates alone to supply small load demands, of controlling the voltage of the system and of utilizing such voltage control in effecting proper load distribution between the synchronous and asynchronous machines, of providing an improved prime mover driven asynchronous generator having a speed governor and/or electrical means controlled from the synchronous unit and of providing improved means whereby the plurality of asynchronous generators may be successively started and brought on to the line and disconnected automatically in accordance with increases or decreases in line load.

Other objects and advantages will be more apparent to those skilled in the art from the following description of the accompanying drawings in which:

Fig. 2 is an enlarged fragmentary view of the prime mover governor and control;

Fig. 3 is a partial diagram embodying a modified combination of controls.

Figure 1:
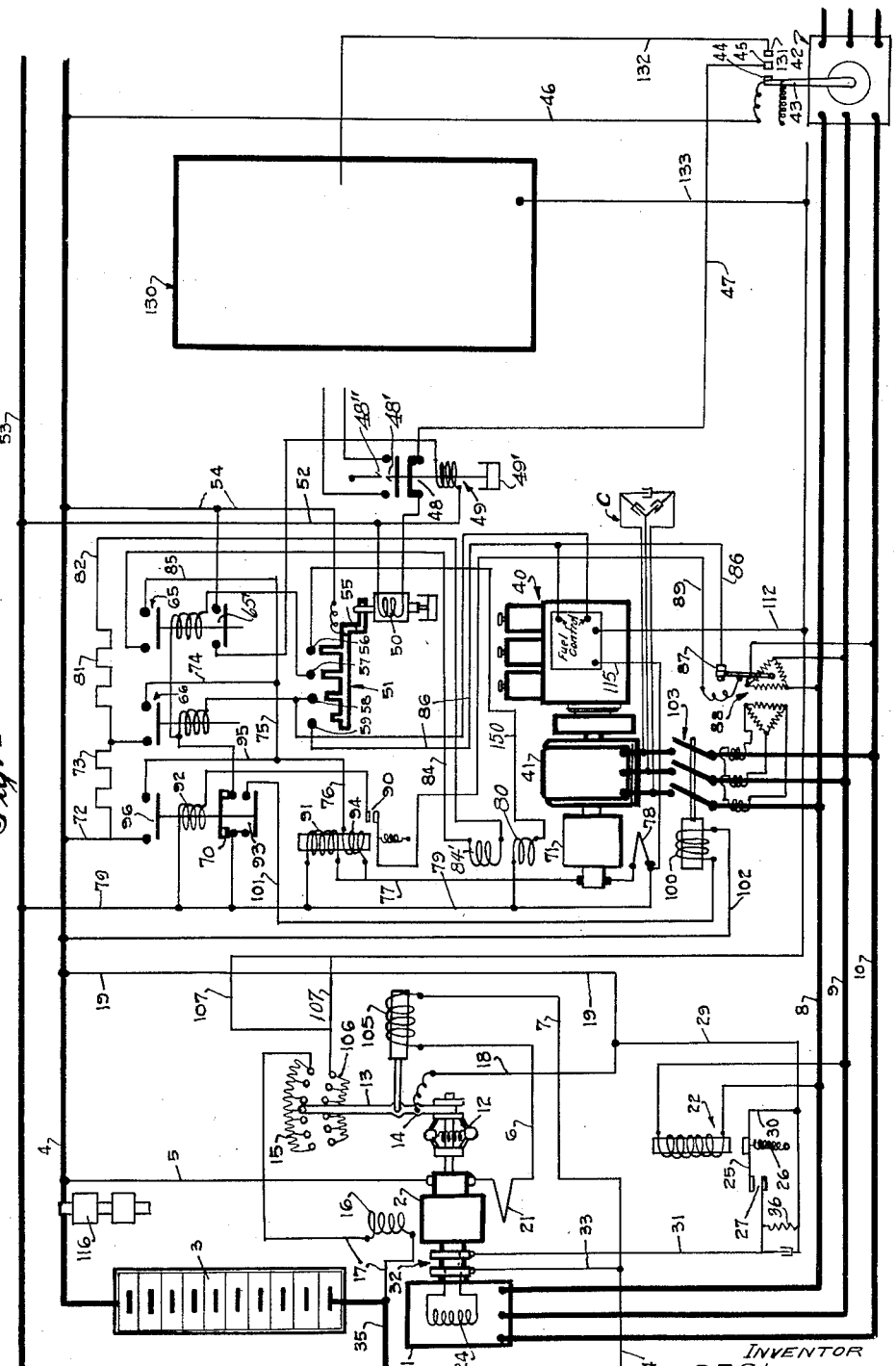
Fig. 1 is a wiring diagram and diagrammatic view of mechanical elements embodied therein illustrating my invention.

In the illustrated embodiments of the invention which are shown herein merely for the purpose of disclosing certain specific forms among possible others that the invention might take, I have provided a synchronous generator 1 driven by a direct current motor 2 which is supplied with current from a battery 3 as through wires 4, 5, 6 and 7. The synchronous generator 1 is connected to a main line 8, 9 and 10 and is adapted in cooperation with battery 3 to operate alone as a unit to supply alternating current for small line loads. However, should the line load increase to a predetermined value, then a prime mover operated generating unit to be described later is brought into operation automatically so as to carry a major portion of the load. For simplicity, the operation of the motor-generator set 1—2 when operating alone will be described first.

When the motor-generator 1—2 is the sole supply of alternating current energy to the lines 8, 9 and 10, the motor 2 is supplied with current from battery 3 to drive direct connected synchronous generator 1. Synchronous speed is maintained by a governor 12 moving an arm 13, about a fixed pivot 14, so as to insert any necessary amount of resistance 15 in series with a shunt field 16 of the direct current motor 2. The shunt field 16 is connected across the terminals of the battery as by wires 17, resistance 15, arm 13 and wires 18, 19 and 4. A slight drop in speed causes arm 13 to move to the left and decrease the current in shunt field 16, thus tending to speed up motor 2, whereas a slight increase of speed causes governor arm 13 to move to the right to increase current in the shunt field 16 and thus cause a lowering of the speed. A series field 21 is normally set to oppose shunt field 16 and is of such strength as to compensate for resistance loss of motor 2, thereby tending to maintain constant speed during variation of load.

A voltage regulator 22 is connected across any two of the main lines such as 8 and 9 to vary the strength of a field 24 of synchronous generator 1. This voltage regulator may be of any desired type, and hence is diagrammatically disclosed herein as having an armature 25 urged downwardly by a spring 26 to close contacts 27. In case of a voltage drop, spring 26 closes contacts 27, whereupon current flows from battery 3 through wires 4, 19, 29 and 30, armature 25 and contacts 27 to a wire 31, thence through one of a pair of slip rings 32 to field 24 and out through the other of the slip rings to wires 33, 34 and armature 25 to the other side of battery 3. The strength of field 24 is thus increased to raise the line voltage. The converse is true when line voltage increases above normal in which case contacts 27 open to cause current for field 24 to flow through a resistance 36. Hence any increase or decrease in speed or frequency will be corrected by governor 12, whereas any variation in voltage will be corrected by regulator 22 which may be of the vibrating type as shown.

In case the line load increases to a point where it is desirable to provide an additional source of power, I have provided a prime mover 40 direct connected to an asynchronous generator 41 such as of the induction motor or generator type. The prime mover may be of any desired form but preferably is a Diesel engine controlled and operated automatically in accordance with the line load demand and adapted to be thrown on to the line and made to take a part of the line load from the synchronous machine 1—2 so that thereafter the synchronous dynamo apparatus 1—2 functions primarily to maintain substantially constant frequency without carrying any substantial increase of load.

As the line load increases, a wattmeter device connected in the line and generally indicated at 42 is adjusted so that its pivot arm 43 swings to the right to close contacts 44 and 45 when the load reaches a predetermined value. Upon closure of these contacts, direct current flows through wires 4 and 46 across contacts 44 and 45, through wire 47 and across normally closed contacts 48 of a time relay generally indicated at 49, thence to coil 50 of a time contact-making device generally indicated at 51 and wire 52 to the other direct current line 53. Energization of coil 50 causes contact device 51 to close a circuit, from direct current line 4 and wire 54 to an arm 55, successively through a series of contacts 56—59. Thereupon a pair of switches 65 and 66 are closed by current to their coils supplied from battery wire 4, wire 54, arm 55, contacts 57 and 58 to parallel connected coils 65 and 66, across normally closed upper contacts 70 to the other side of the battery line 53. Upon closure of switches 65 and 66, current feeds to a direct current machine 71 as from wire 4 to wire 72, thence through a resistance 73, across switch 66 to wires 74, 75, 76 and 77 to machine 71 and thence through series field 78 and wire 79 to the other side of battery line 53, it being noted that a field 84' for machine 71 is supplied with current through wire 84 upon closure of contacts 65. Simultaneously current for shunt field 80 of machine 71 is supplied from wires 4 and 54, thence through arm 55 and contact 56, through wire 150, shunt field 80 and wire 79 to wire 53 of direct current supply circuit. Machine 71 thus acts as a motor to rotate engine 40 and start the same in a manner such as disclosed in my Patent No. 1,866,494 and pending application, Serial No. 622,967.

In the event that engine 40 fails to start due to any one of various causes, then it is necessary to cut out this engine and start up a substitute engine. The following controls and operation accomplish this result. Upon energization of switch coil 65, a lower set of contacts 65' are closed to supply current from wire 54 through wires 54' to solenoid 49. This solenoid thereupon gradually moves against the action of a dashpot 49' and if this movement continues long enough it will finally open contacts 48 and stop machine 71 acting as a motor and thus eliminate the prime mover generating unit. At the same time a set of upper contacts 48' will close so as to start the next prime mover generating unit 130 by closure of a circuit with wire 132 to be described later. Also upon closure of contacts 48', a bell or other signal device may be operated by a solenoid closing a signal circuit. Continued closure of this signal circuit is maintained due to a switch 48' being held in its upper position by latch 48'' when said switch closes. This latch may be manually released when desired which preferably is after the defective condition is corrected.

However, if the engine 40 should be in good operative condition so as to start and come up to speed before contacts 48 open, then machine 71 will have caused voltage and reverse current relay 91 and 94 to close contacts 90 and energize coil 92 in a manner to be described presently, thereby putting machine 71 directly across the line by closure of contact 96. At the same time starting switches 65 and 66 will be opened. Opening of these starting switches also effects opening of contacts 65', thereby opening the circuit through wire 54 and 54' to deenergize coil 49 and thus prevent contacts 48 from opening. The prime mover generating unit 40 is thus allowed to remain in service.

The manner of closing contacts 90 as above described is as follows. Upon closure of contact switch 51, current also feeds from battery line 4, through wire 54, contact 59, wire 86, across normally closed contacts 87 of an A. C. reverse current device generally indicated at 88 and thence through wire 89 to contacts 90 which as shown are yieldingly held open. However, as engine 40 comes up to full speed, the voltage of D. C. machine 71 will correspondingly increase to a full speed voltage whereupon a relay 91 causes contacts 90 to close and thereby permit energization of a coil 92 to close a lower set of contacts 93. Relay 91 has been previously partially energized by current through a coil 94. Closure of contacts 96 places direct current machine 71 across battery lines 4 and 53 as by wires 77, 76 and 95, contacts 96 closed simultaneously with closure of contacts 93, and thence through wire 72 to line 4. Direct current machine 71 may now serve either as a generator to recharge battery 15 or to supply current to D. C. machine 2 for operating synchronous machine 1.

Relay 91 is connected at all times across the armature of direct current machine 71 as by being connected in parallel with wires 77 and 79, and hence this relay is adapted to perform its speed responsive functions as above described.

Simultaneously with the closure of contacts 96, lower contacts 93 are closed thereby energizing a solenoid 100 by current supplied from battery wire 53 through wire 79, across contacts 93 to wire 101, thence through solenoid 100 to wire 102 to the other side of the battery line 4. Energization of solenoid 100 closes a switch 103, thus placing asynchronous generator 41 directly on the lines 8, 9 and 10. The asynchronous generator will supply alternating current to the line providing its speed is slightly above synchronism of lines 8, 9 and 10. This is accomplished in that the increase of line load, which necessitated starting the prime mover unit, causes a drop in line voltage thereby causing voltage regulator 22 to act on the fields of synchronous generator 1 to increase the load thereon, resulting in direct current motor 2 taking more current. This increased current causes a coil 105, connected in series with a series field 21 of motor 2, to exert a sufficient force on governor arm 13 to move the same in a right hand direction. Thereupon resistance 15 is reduced, allowing greater current flow through shunt field 16 and thus reduce slightly the speed of motor 2. This reduced speed causes a slight drop in line frequency to a point below the speed of synchronous generator 41 thus causing this generator to assume more load. Simultaneously with the adjustment of rheostat 15 due to said movement of arm 13, a rheostat 106 is also adjusted so as to increase direct current from wires 4, 19 and 18 and arm 13 to a wire 107, thereby (Fig. 2) increasing the pull of a solenoid 110 which acts on an engine governor 111. The current supply (Figs. 1 and 2) for this solenoid is from wires 107 to wires 112, 113 to solenoid 110, thence through wires 114, 115 and 79 to the other side of the D. C. line 53. The increased pull of solenoid 110 causes a slight increase of engine speed, this in turn causing asynchronous generator 41 to assume further load.

The relative proportions of the coils 105 (Fig. 1) and 110 (Fig. 2) with respect to resistances 15 and 106 are such that the synchronous generator set 1—2 will manually carry only a small proportion of the total line load except when the synchronous set is operating alone or when a sudden load is put on the line. It is thus seen that if the line load increases still further, the voltage and frequency will further slightly drop so as to cause a further increase of current in field 24 of the synchronous generator and thus increase the load thereon resulting in a further slight decrease of motor speed, thereby causing governor 12 to insert still further current in shunt field 16 and thus further decrease slightly the synchronous speed accompanied by an increase of current flow through solenoid 105 so as to adjust resistance 106 to permit an increase of current to engine solenoid 110 (Fig. 2), whereupon governor 111 is adjusted to increase the speed of the Diesel engine and made to carry still further load. This method continues for further increases of line load although it will be understood that the control apparatus is responsive to very small changes in frequency and voltage so that from no-load to full load the voltage and frequency will not be materially altered.

The reverse operation occurs during a decrease of load on lines 8, 9 and 10 because a drop in load is accompanied by an increase of voltage, whereupon voltage regulator 22 will decrease the current in field 24 of synchronous machine 1 and thus cause motor 2 to take less current, whereupon coil 105 decreases its pull on governor arm 13, thus permitting the speed of the synchronous unit 1—2 to rise slightly and at the same time the pull of solenoid 110 on engine governor 111 is reduced thus allowing the speed of engine 40 to fall slightly.

Relay 88 which controls the connection or disconnection of the asynchronous generator to the line is set to fall open and break its switch 103 in case the asynchronous generator 41 falls sufficiently in speed so that it draws current from the line and starts acting as a motor. Such a mode of operation would usually be caused by some trouble or disturbance on the line, but after this abnormal condition is corrected, contacts 87 can be reclosed manually. This relay 88 can also be set to allow for a small amount of excitation current drawn from the line by asynchronous generator 41.

The synchronous generator 1 may be of such size as to absorb all the wattless current on the line. Condensers C can be used across the terminals of the asynchronous generator 41 to assist in carrying wattless current, but must be of such capacity as not to disturb the control of line frequency and voltage by motor generator unit 1—2.

Also if desired a battery booster 116 may be inserted in the line 4, although this is a matter which would be determined in accordance with the size of the generating plant and the load conditions under which it operates.

In Fig. 3 a modified and preferred form of controls for the synchronous generating set is disclosed. In operation when the load on synchronous generator 1 increases, governor 12 moves so as to hold the speed of the motor generator set 1—2 practically constant, this being accomplished by adjustment of resistance 15 in the same manner as previously described in the Fig. 1 form. However, as a mechanical governor can have say two percent lower speed at full load than at no-load, this drop in speed would cause asynchronous generator 41, Fig. 1, to take some load. Now instead of having both resistances 15 and 106 controlled by governor arm 13 as in the form shown in Fig. 1, I preferably employ a solenoid 117 adapted to move an arm 118 against the action of a spring 119, thereby adjusting resistance 106 to feed more current into the engine governor coil 110 as by wires 107, 112, etc. The foregoing mode of operation takes place as the load increases on synchronous generating units 1—2. This arrangement is more easily adjusted than in the form shown in Fig. 1. If desired, solenoid 105 such as shown in the Fig. 1 form may be also combined with solenoid 117. Such a solenoid is shown in dotted lines at 105a, Fig. 3. As a result of this arrangement, it is possible to secure rapid action in raising or dropping the speed of machines 1—2.

To provide for a line load beyond the capacity of one prime mover unit, additional units and controls similar to the first unit are automatically started and brought on to the line as required by the load demand. One of such additional units is diagrammatically indicated at 130, which is to be considered as identical in every respect with the unit 40 and its controls. To start unit 130, wattmeter 42 will move its arm 43 further to the right (which is after contacts 44 and 45 have been closed to start unit 40) upon a predetermined increase in line load, whereupon contacts 44 and 45 will move to close contact 45 with a contact 131. This closes a circuit through a wire 132 corresponding to wire 47 and thereby starts the second unit. Wire 133 corresponds to wire 112, other corresponding wires and devices being omitted for simplicity. Solenoid 110 of the engine governor controls may be connected in parallel and will act in unison on any generating unit which may be in operation.

My improved system has many advantages among which are the ability to closely control asynchronous speed by an accurate governor 16, thereby permitting the engine governors not to be so accurately constructed as is ordinarily necessary for parallel operation of synchronous generators. The extreme simplicity of the A. C. switching mechanism 103 and associated control apparatus eliminates any synchronizing problem in bringing an A. C. machine on to the line, and therefore no line disturbance will occur when the asynchronous generator is thrown on the line. Also only one voltage regulator is necessary and on small plants this saving and expense are very important particularly where three or four generating units are used.

The starting and stopping of the engines are accomplished in exactly the same manner as is now done with the direct current installation shown in my Patent No. 1,866,494, and this method is proved to be very reliable and successful. The only variation from said systems is that in the present disclosure the direct current motor 28 is not of sufficient capacity to take the full power of the engine, although for starting purposes it can take up to 300 percent normal full load current for a few seconds and thereby develop sufficient torque to start the engine. Also the A. C. reverse current device 88 acts to stop the prime mover generating unit as well as direct current reverse current device 91—94. Inasmuch as the direct current machine 28 which sometimes acts as a generator will not develop its full voltage until the generating unit comes up to speed, there is the assurance that the asynchronous generator 27 is operating at sufficient speed to act as a generator as soon as switch 103 closes.

It will of course be understood that various changes in details of construction and arrangement of parts may be made by those skilled in the art without departing from the spirit of the invention as set forth in the appended claims.

I claim:

1. An alternating current power generating system comprising, in combination, a synchronous generator and an asynchronous generator both connected to a line, means for controlling the speed of said synchronous machine automatically in accordance with increases of line load, and means for automatically increasing the speed of said asynchronous generator upon said increase of line load whereby said asynchronous generator carries a substantial portion of all increases of load and said synchronous generator carries a proportionately smaller portion of the line load while establishing the frequency of the line current.

2. An alternating current power generating system comprising, in combination, a synchronous generator and an asynchronous generator both of which are adapted to supply the same line, and means for reducing the speed of said synchronous generator automatically in accordance with an increase of line load thereby causing said asynchronous generator automatically to take on a proportionate share of the increase of line load.

3. An alternating current power generating system comprising, in combination, a synchronous generator and an asynchronous generator both of which are adapted to supply the same line, means for reducing the speed of said synchronous generator automatically in accordance with an increase of line load thereby causing said asynchronous generator automatically to take on a proportionate share of the increase of line load, and means for increasing the speed of said asynchronous generator automatically in accordance with said increases of line load thereby to more positively cause said asynchronous generator to assume a still greater proportion of the increase of line load.

4. An alternating current power generating system comprising, in combination, a synchronous generator and an asynchronous generator, means for increasing the speed of said synchronous generator automatically in accordance with a decrease of line load, means for thereupon automatically decreasing the speed of said asynchronous generator to reduce the load carried thereby, and means for restoring said synchronous generator substantially to its normal speed.

5. An alternating current power generating system comprising, in combination, a synchronous generator unit having a synchronous generator driven by a direct current motor, a prime mover driven asynchronous generator, means for starting said prime mover automatically in accordance with the predetermined increase of line load, means for increasing the load on said synchronous unit automatically in accordance with said increase of line load thereby to decrease the speed of said synchronous unit, and means responsive to said decrease of synchronous speed to increase the speed of said prime mover asynchronous generator thereby to cause the same to carry a larger proportion of the increased line load.

6. An alternating current power generating system comprising, in combination, a synchronous generating unit having a synchronous generator driven by a direct current motor, a prime mover operated asynchronous generator, means for varying the field strength of said direct current motor automatically in accordance with variations in the line load thereby to control the speed of said synchronous unit, and means whereby upon varying said field strength the speed of said prime mover is increased, thereby to cause the same to carry a larger proportion of the increased line load.

7. An alternating current power generating system comprising, in combination, a synchronous generating unit connected to a line to supply small loads thereof, a plurality of prime mover generating asynchronous generating units, means for successively starting said prime movers automatically in accordance with successive increases of line load, and means for controlling the proportioning of load between said synchronous unit and said asynchronous units.

8. An alternating current power generating system comprising, in combination, a synchronous generator adapted to supply current to a line, a prime mover operated asynchronous generator, means for starting said prime mover automatically upon a predetermined increase of line load, means for connecting said asynchronous generator to the line automatically when the speed of said prime mover reaches a predetermined value, and means for coordinating the operation of said synchronous and asynchronous generators to control the proportioning of load therebetween.

9. The combination set forth in claim 8 further characterized by the provision of means for shifting the load between said synchronous and asynchronous generators to effect a predetermined proportioning of load therebetween whereby the speed of the prime mover asynchronous generator is increased so as to compel it to carry a larger proportion of the total line load.

10. An alternating current power generating system comprising, in combination, a synchronous generator driven by a direct current motor, an asynchronous generator, means whereby the load on said motor increases upon an increase of line load, a current coil whose energization increases with increased load on said motor, and means controlled by said current coil for increasing the speed of said asynchronous generator thereby to compel it to take more of the line load.

11. An alternating current power generating system comprising, in combination, a synchronous generator having a governor, an asynchronous generator, both of which are adapted to supply a common line load, means controlled by said synchronous governor whereby upon increase of line load the speed of the synchronous generator is decreased and its governor operated to increase the speed of said asynchronous generator thereby to compel said asynchronous generator to carry a larger proportion of the increased line load.

12. The combination set forth in claim 10 further characterized by the provision of a speed responsive governor operated from said synchronous generator and having provision for decreasing the speed of said synchronous generator automatically upon an increase of line load thereby to compel said asynchronous generator to carry more positively a portion of the increased line load.

13. The combination set forth in claim 10 further characterized by the provision of a speed responsive governor operated from said synchronous generator and having provision for decreasing the speed of said synchronous generator automatically upon an increase of line load thereby to compel said asynchronous generator to carry more positively a portion of the increased line load, said governor and current responsive means being mechanically independent of each other.

14. An alternating current power generating system comprising, in combination, a synchronous generator, an asynchronous generator having electrical means for controlling the asynchronous speed, and means controlled by said synchronous unit for controlling said asynchronous electrical means automatically in accordance with variations in line load whereby upon an increase of line load said asynchronous generator is made to carry a larger proportion of the increased line load.

15. The combination set forth in claim 10 further characterized by the provision of a speed responsive governor operated from said synchronous generator and having provision for decreasing the speed of said synchronous generator automatically upon an increase of line load thereby to compel said asynchronous generator to carry more positively a portion of the increased line load, said governor and current responsive means being mechanically connected to each other.

16. An alternating current power generating system comprising, in combination, a synchronous generator, a prime mover operated asynchronous generator, means for starting said prime mover automatically upon a predetermined increase of line load, means for connecting said asynchronous generator to the line automatically when the asynchronous speed reaches a substantially normal value, and means for proportioning the load between said synchronous and asynchronous generators automatically so that said synchronous generator supplies only a certain small maximum proportion of the total line load.

17. An alternating current power generating system comprising, in combination, a synchronous generator and one or more asynchronous generators, means for regulating the voltage and speed of the synchronous generator so as to cause asynchronous generator or generators to assume load as line load increases, and means for regulating the driven speed of the asynchronous generator or generators so that increase of load on the synchronous generator causes driving means to increase the speed of the asynchronous generator or generators.

18. An alternating current power generating system comprising, in combination, a synchronous generator and one or more asynchronous generators and means for regulating the voltage and speed of the synchronous generator so as to cause asynchronous generator or generators to lose load as line load decreases, and means for regulating the driven speed of the asynchronous generator or generators so that a decrease in load on the synchronous generator causes driving means to decrease speed of asynchronous generator.

19. An alternating current power generating system comprising, in combination, a synchronous generator set having a synchronous speed governor, a prime mover driven asynchronous generating unit also having a governor, voltage regulator means for increasing the field current on said synchronous generator automatically upon an increase of line load whereupon the load of the synchronous generator is increased and its speed reduced thereby slightly lowering the frequency and causing said asynchronous generator to assume a portion of the line load, load responsive means operable simultaneously with said increase of load on said synchronous generator to lower the controlled synchronous speed thereof, means simultaneously operable with said load responsive means to change the adjustment of said prime mover governor so as to increase the speed of said asynchronous generator thereby to effect a slight voltage change on the line whereupon said voltage regulator means reduces the field on said synchronous generator so that full load on said asynchronous machine is a definite percentage of the line load, and said synchronous generator governor thereupon adjusts said load responsive means so that said synchronous generator operates at synchronous speed upon decrease of line load.

20. An alternating current power generating system comprising, in combination, a synchronous generator, a prime mover operated asynchronous generator, both of said generators being adapted to supply the same line, means for starting said prime mover automatically upon predetermined increase of line load, and means for automatically controlling the operation of said synchronous generator to proportion the load with the asynchronous generator.

CHESTER F. STRONG.